United States Patent
Qi et al.

(10) Patent No.: US 10,247,985 B2
(45) Date of Patent: Apr. 2, 2019

(54) COLOR FILTER SUBSTRATE, DISPLAY PANEL AND DISPLAY DEVICE

(71) Applicant: BOE TECHNOLOGY GROUP CO., LTD., Beijing (CN)

(72) Inventors: Yonglian Qi, Beijing (CN); Tingting Zhou, Beijing (CN); Bin Zhang, Beijing (CN); Chuanxiang Xu, Beijing (CN); Xin Gu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/508,240

(22) PCT Filed: Jul. 29, 2016

(86) PCT No.: PCT/CN2016/092261
§ 371 (c)(1),
(2) Date: Mar. 2, 2017

(87) PCT Pub. No.: WO2017/071344
PCT Pub. Date: May 4, 2017

(65) Prior Publication Data
US 2018/0224698 A1    Aug. 9, 2018

(30) Foreign Application Priority Data
Oct. 28, 2015    (CN) .......................... 2015 1 0713820

(51) Int. Cl.
*G02F 1/1335*    (2006.01)

(52) U.S. Cl.
CPC .. *G02F 1/133606* (2013.01); *G02F 1/133512* (2013.01); *G02F 1/133514* (2013.01);
(Continued)

(58) Field of Classification Search
CPC ......... G02F 1/133606; G02F 1/133528; G02F 1/133617; G02F 1/133621;
(Continued)

(56) References Cited

U.S. PATENT DOCUMENTS 6,469,755 B1 * 10/2002 Adachi ................ G02B 6/0018
349/62
2004/0114066 A1 * 6/2004 Takeuchi .......... G02F 1/133603
349/61
(Continued)

FOREIGN PATENT DOCUMENTS

CN    102866535 A    1/2013
CN    203337950 U    12/2013
(Continued)

OTHER PUBLICATIONS

Second Office Action for Chinese Application No. 201510713820. X, dated Jan. 12, 2018, 5 Pages.
(Continued)

*Primary Examiner* — Hoan C Nguyen
(74) *Attorney, Agent, or Firm* — Brooks Kushman P.C.

(57) ABSTRACT

A color filter substrate, a display panel and a display device are provided. The color filter substrate includes a base plate and a color filter layer formed on the base plate, a photoluminescent layer arranged at a side of the color filter layer away from the base plate, and a brightness enhancement structure arranged at the side of the color filter layer away from the base plate. In the color filter substrate, by arranging the photoluminescent layer and the brightness enhancement structure at the side of the color filter layer away from the base plate, the color filter substrate has a better color gamut and the brightness at a light-outgoing side is increased.

16 Claims, 3 Drawing Sheets

(52) U.S. Cl.
CPC .. G02F 1/133528 (2013.01); G02F 1/133617 (2013.01); G02F 1/133621 (2013.01); *G02F 2001/133507* (2013.01); *G02F 2001/133607* (2013.01); *G02F 2001/133614* (2013.01); *G02F 2202/36* (2013.01)

(58) Field of Classification Search
CPC ........ G02F 2001/133607; G02F 2001/133614; G02F 2002/36
USPC .......................................................... 349/106
See application file for complete search history.

(56) References Cited

U.S. PATENT DOCUMENTS

| | | | | |
|---|---|---|---|---|
| 2006/0261728 | A1* | 11/2006 | Yamazaki | H01L 51/5036 313/503 |
| 2006/0284532 | A1* | 12/2006 | Kurihara | G02F 1/133617 313/110 |
| 2007/0090755 | A1* | 4/2007 | Eida | B82Y 20/00 313/506 |
| 2009/0122530 | A1* | 5/2009 | Beers | F21K 9/00 362/230 |
| 2009/0141476 | A1* | 6/2009 | Meir | G02B 6/005 362/84 |
| 2010/0067214 | A1* | 3/2010 | Hoelen | C09K 11/0883 362/84 |
| 2013/0010229 | A1 | 1/2013 | Shin et al. | |
| 2015/0048348 | A1* | 2/2015 | Huang | H01L 27/322 257/40 |
| 2015/0277188 | A1 | 10/2015 | He | |

FOREIGN PATENT DOCUMENTS

| | | |
|---|---|---|
| CN | 103869530 A | 6/2014 |
| CN | 104280935 A | 1/2015 |
| CN | 105204221 A | 12/2015 |
| JP | H10170918 A | 6/1998 |

OTHER PUBLICATIONS

First Office Action for Chinese Application No. 201510713820.X, dated Sep. 15, 2017, 7 Pages.

International Search Report and Written Opinion for Application No. PCT/CN2016/092261, dated Nov. 2, 2016, 11 Pages.

* cited by examiner

COLOR FILTER SUBSTRATE, DISPLAY PANEL AND DISPLAY DEVICE

CROSS-REFERENCE TO RELATED APPLICATIONS

This application is the U.S. national phase of PCT Application No. PCT/CN2016/092261 filed on Jul. 29, 2016, which claims priority to Chinese Patent Application No. 201510713820.X filed on Oct. 28, 2015, the disclosures of which are incorporated in their entirety by reference herein.

TECHNICAL FIELD

The present disclosure relates to the field of display technology, in particular to a color filter substrate, a display panel and a display device.

BACKGROUND

Liquid crystal displays have become commonly used due to advantages such as low energy consumption and being light and thin. The display panel of the liquid crystal display in the related technology mainly includes an array substrate, a color film substrate and a liquid crystal layer between the two substrates. In addition, a color filter layer is arranged at the color filter substrate to convert the white light emitted by a light source into monochromatic lights in red, light and blue, thereby realizing colorful display.

However, the display device which can achieve a better color gamut and a further improved brightness in addition to colorful display has not been developed in the field of liquid crystal display, which becomes a technical problem to be solved in the field of liquid crystal display.

SUMMARY

(I) Technical Problem to be Solved

The present disclosure aims to provide a color filter substrate, a display panel and a display device, which have better color gamut and increased brightness.

(II) Technical Solution

In order to solve the above-mentioned problem, in a first aspect, some embodiments of the present disclosure provide a color filter substrate, which includes: a base plate; a color filter layer formed on the base plate; a photoluminescent layer arranged at a side of the color filter layer away from the base plate; and a brightness enhancement layer arranged at the side of the color filter layer away from the base plate.

In a possible implementation, the brightness enhancement structure includes a first prism film arranged at a side of the photoluminescent layer away from the color filter layer, and the first prism film is used to reflect an incident light from the photoluminescent layer back to the photoluminescent layer.

In a possible implementation, the color filter substrate further includes a black matrix formed on the base plate, the first prism film includes multiple first prisms, and each first prism corresponds to a position of the black matrix.

In a possible implementation, the black matrix is provided with a light reflecting layer on a surface facing the first prism film.

In a possible implementation, the brightness enhancement structure includes a second prism film, the second prism film is used to refract an incident light from a side of the second prism film away from the color filter layer to the color filter layer.

In a possible implementation, the second prism film is arranged between the color filter layer and the photoluminescent layer.

In a possible implementation, the second prism film includes multiple second prisms each of which corresponds to a position of the color filter layer.

In a possible implementation, the photoluminescent layer includes a photoluminescent material and a photoresist.

In a possible implementation, the photoluminescent material includes at least one of: a quantum dot and a quantum rod.

In a possible implementation, a mass fraction of the photoluminescent material in the photoluminescent layer ranges from 1% to 50%.

In a possible implementation, the color filter layer includes multiple filter units of different colors, the photoluminescent layer includes multiple light-emitting units, and each of the multiple light-emitting units corresponds to one filter unit and is configured to emit light of an identical color to the corresponding filter unit.

In order to solve the above-mentioned problem, in a second aspect, some embodiments of the present disclosure provide a display panel which includes the above-mentioned color filter substrate.

In a possible implementation, the display panel further includes, from top to bottom, a first polarizer, an array substrate, a liquid crystal layer and a second polarizer.

In order to solve the above-mentioned problem, in a third aspect, some embodiments of the present disclosure provide a display device which includes a backlight and the above-mentioned display panel.

In a possible implementation, the backlight emits blue light, and the photoluminescent layer includes a green light-emitting unit and a red light-emitting unit. The green light-emitting unit emits green light under irradiation of the blue light and the red light-emitting unit emits red light under irradiation of the blue light.

(III) Beneficial Effect

At least one of the above-mentioned technical solutions of the embodiments of the present disclosure has the following beneficial effects. In the color filter substrate provided by the present disclosure, by arranging the photoluminescent layer and the brightness enhancement structure at the side of the color filter layer away from the base plate, the color filter substrate has a better color gamut and the brightness at the light-outgoing side is also increased.

BRIEF DESCRIPTION OF THE DRAWINGS

In order to more clearly illustrate the embodiments of the present disclosure or the technical solutions in the related art, drawings to be used in the description of the embodiments will be briefly described below. Apparently, the drawings in the following description relate to only some embodiments of the present disclosure. It will be apparent to a person of ordinary skills in the art that other drawings may be derived from the drawings without any creative work.

Figure 1:
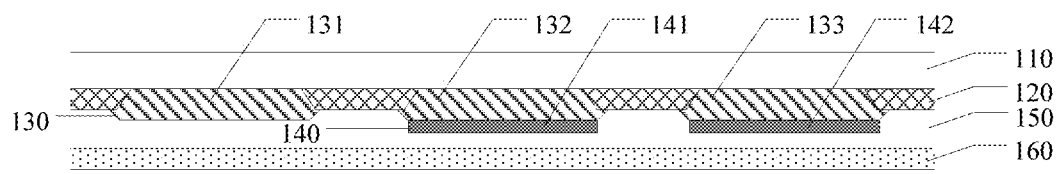
FIG. 1 is a schematic diagram of a color filter substrate provided by an embodiment of the present disclosure.

Numeral references are explained as follows:

110: base plate; 120: black matrix; 130: color filter layer; 140: photoluminescent layer; 150: protective layer; 160: first prism film; 170: second prism film; 131: first color filter unit; 132: second color filter unit; 133: third color filter unit; 141: green light-emitting unit; 142: red light-emitting unit; 161: first prism; 171: second prism; 210: second polarizer; 220: intermediate substrate; 230: liquid crystal layer; 240: array substrate; 250: first polarizer.

DETAILED DESCRIPTION

The present disclosure will be specifically described in conjunction with accompanying drawings and embodiments. The following embodiments are merely illustrative for the present disclosure and are not intended to limit the scope of the present disclosure.

In order to make the objectives, technical solutions and advantages of the embodiments of the present disclosure more clear, the technical solutions of the embodiments of the present disclosure will be clearly and completely described below with reference to the accompanying drawings of the embodiments of the present disclosure. Apparently, the described embodiments are part of the embodiments of the present disclosure, but not all the embodiments. All other embodiments obtained by a person of ordinary skills in the art based on the described embodiments of the present disclosure fall within the scope of the present disclosure.

Unless otherwise defined, technical or scientific terms used herein shall have the ordinary meanings as understood by a person of ordinary skills in the art to which the present disclosure pertains. The words "first", "second" and the like as used in the specification and claims of the present disclosure do not denote any order, amount or importance, but are merely used to distinguish different constituent parts. Similarly, the words "a" or "an" and the like are merely used to represent the existence of at least one member, rather than to limit the number thereof. The words "connect to" or "connect with" and the like are not limited to physical or mechanical connections, but may include electrical connections, whether direct or indirect. The words "on/above", "under/below", "left" and "right" and the like are merely used to indicate relative position relationships, and when an absolute position of the described object changes, the relative position relationships changes accordingly.

In order to make the technical problems, technical solutions and advantages of the present disclosure more clear, the present disclosure will be described below in detail with reference to the accompanying drawings and the embodiments.

Currently, the liquid crystal displays are developing in directions of wide color gamut, high brightness, low power consumption, etc. In order to enlarge the color gamut, quantum dots may be used in the field of liquid crystal display. Since the quantum dot has a very narrow light wavelength range and a very pure color, and can also be finely adjusted, the purity of the color may be increased without increasing the color density of the color filter layer. Currently, the fluorescence quantum efficiency of the quantum dot, however, is very low, resulting in a low brightness of the display where the quantum dots are applied.

The present disclosure, in some embodiments, provides a color filter substrate which includes: a base plate; a color filter layer formed on the base plate; a photoluminescent layer arranged at a side of the color filter layer away from the base plate; and a brightness enhancement structure arranged at the side of the color filter layer away from the base plate.

In the color filter substrate provided by the embodiments of the present disclosure, by arranging the photoluminescent layer and the brightness enhancement structure at the side of the color filter layer away from the base plate (i.e. at a light-incoming side), the color filter substrate has a relatively good color gamut and the brightness of a light-outgoing side is also increased.

In the color filter substrate provided by some embodiments of the present disclosure, the photoluminescent layer includes a photoluminescent material. For example, the photoluminescent material may be quantum dots or quantum rods that emit light of a desired wavelength under irradiation of external light. Hereinafter it is described by taking the quantum dots for example, where quantum dots are tiny semiconductor nanocrystals that are not visible to naked eyes and are composed of zinc (Zn), cadmium (Cd), selenium (Se) and sulfur (S) atoms and so on. In addition, diameters of particles in the crystals are usually less than 10 nm, and these crystals have a distinctive feature: when subjected to an electrical or optical stimulation, these crystals will emit light of solid color. Specifically, the color of the emitted light depends on the material, the size and the shape of the quantum dots. Specifically, the smaller the size is, the bluer the light is, and the larger the size is, the redder the light is. Therefore, the size of the quantum dots may be adjusted based on the actual requirements to obtain lights of different colors.

Further, in order to form a photoluminescent layer of a required pattern, the above-mentioned photoluminescent layer further includes a photoresist. Optionally, it is possible to mix the above-mentioned photoluminescent material into the photoresist so that the photoluminescent material may be patterned. During the patterning process, the photoresist mixed with the photoluminescent material may be coated on a substrate, and then processes such as exposing, developing are performed on the photoresist to obtain the photoluminescent layer of a predetermined pattern. In a possible embodiment, in the above-mentioned photoluminescent layer obtained via the patterning process, a mass fraction of the photoluminescent material may range from 1% to 50%, for example may preferably be 10%, 20%, 30%, in order to obtain good light emitting effect of the photoluminescent layer.

In the color filter substrate provided by the embodiments of the present disclosure, by arranging the brightness enhancement structure therein, the brightness at the light-outgoing side of the color filter substrate is increased. For example, the brightness enhancement structure may be a prism film or a brightness enhancement film and so on. Referring to FIG. 1, a schematic diagram of a color filter substrate provided by an embodiment of the present disclosure is shown. The color filter substrate includes a base plate 110, a black matrix 120 and a color filter layer 130 formed on the base plate 110, a photoluminescent layer 140, a protective layer 150 and a brightness enhancement structure (a first prism film 160) arranged at a side of the color filter layer 130 away from the base plate 110.

The color filter layer 130 includes a first color filter unit 131, a second color filter unit 132 and a third color filter unit 133. For example, the first color filter unit may be a blue (B) filter unit, the second color filter unit may be a green (G) filter unit, and the third color filter unit may be a red (R) filter unit.

The photoluminescent layer 140 includes multiple light-emitting units 141 and 142, and each light-emitting unit 141 or 142 corresponds to one filter unit 131, 132 or 133. Each light-emitting unit is used to emit light of the same color as the corresponding filter unit. For example, if a blue backlight is used, it is possible to provide light-emitting units of two colors for the above-mentioned color filter layer, i.e., a green light-emitting unit 141 corresponding to the green filter unit 132 and a red light-emitting unit 142 corresponding to the red filter unit 133, as shown in FIGS. 1, 2, 5, 6 and 7. The green light-emitting unit emits green light under the irradiation of blue light, and the red light-emitting unit emits red light under the irradiation of blue light.

As shown in FIG. 1, the brightness enhancement structure includes a first prism film 160 arranged at the side of the photoluminescent layer away from the color filter layer. The first prism film 160 is used to reflect incident light from the photoluminescent layer 140 back to the photoluminescent layer 140. The first prism film 160 is arranged under the photoluminescent layer 140 so that photons emitted downwards may be collected and emitted upwards. Consequently, more light may be converted by the photoluminescent layer 140 into light of required colors and then exit from the light-outgoing side of the color filter substrate, thereby increasing the brightness at the light-outgoing side of the color filter substrate.

Figure 2:
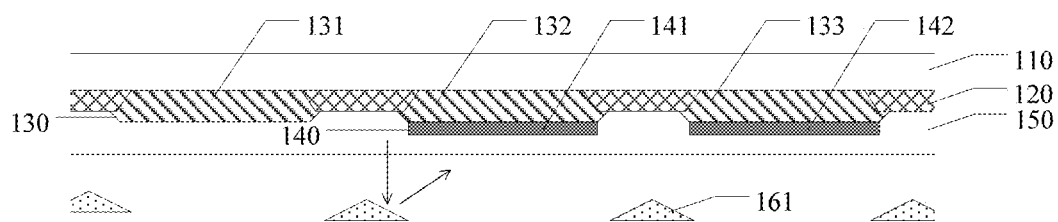
FIG. 2 is a schematic diagram of a color filter substrate provided by an embodiment of the present disclosure.

For example, as shown in FIG. 2, the first prism film 160 may include multiple first prisms 161 each of which corresponds to the position of the black matrix 120. The first prism 161 may reflect incident light onto a surface of the first prism back to the photoluminescent layer 140, thereby increasing the light intensity at the light-outgoing side of the color filter substrate. In a possible embodiment, a light reflecting layer (not shown in FIG. 2) may be arranged on a surface of the black matrix 120 facing the first prism film 160. The light reflecting layer may enable more light to strike on the first prism 161, so that the brightness at the light-outgoing side of the color filter substrate may be further increased.

Figure 3:
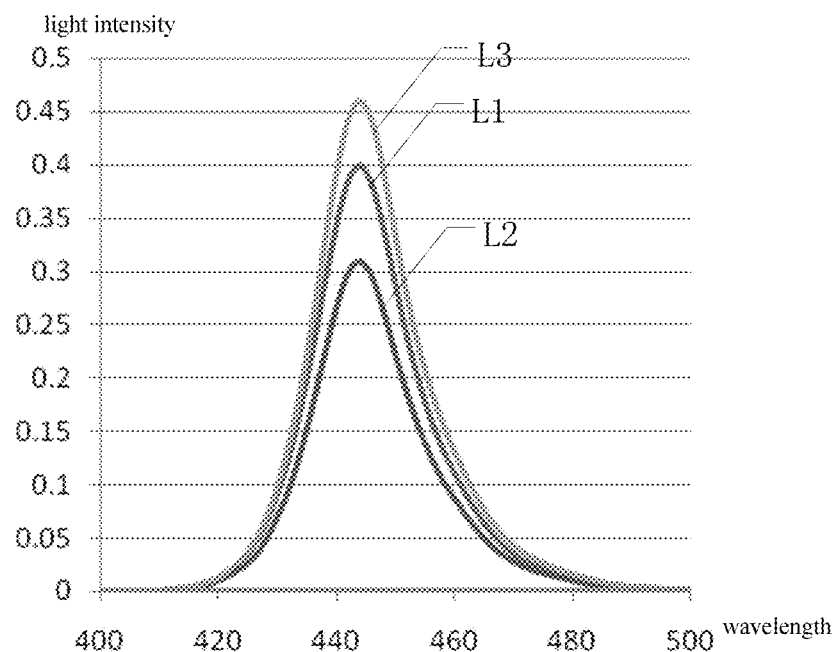
FIGS. 3 and 4 illustrate curves showing a relationship between the optical wavelength against the light intensity with a prism film added according to the present disclosure.
Figure 4:
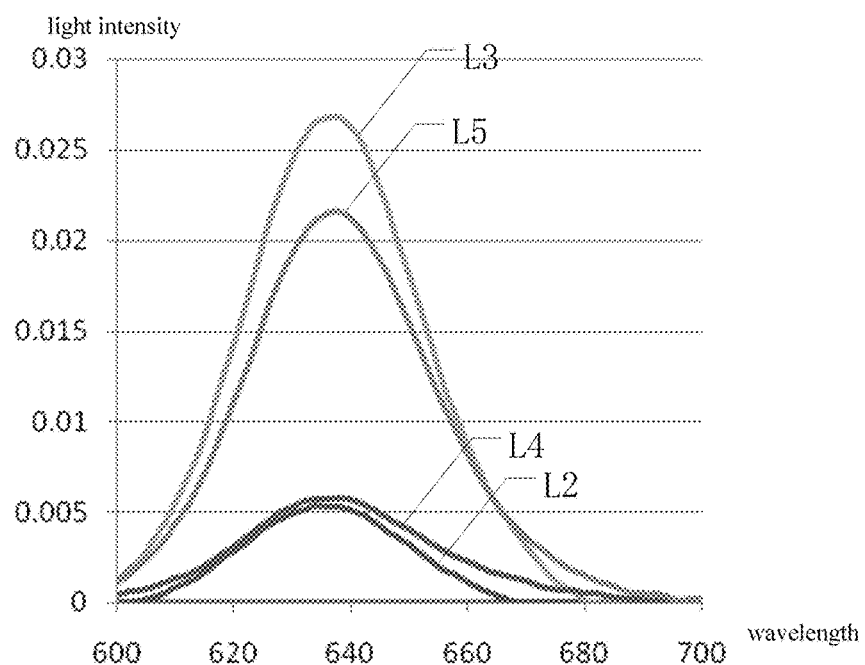

In particular, as shown in FIGS. 3 and 4, the display brightness may be effectively increased with arrangement of the above-mentioned prism film. The curve L1 indicates intensities of lights of different wavelengths emitted by the blue backlight, the curve L2 indicates intensities of lights of different wavelengths obtained by making the lights emitted by the blue backlight pass through a red photoluminescent layer, the curve L3 indicates intensities of lights of different wavelengths obtained by making the lights emitted by the blue backlight pass through the first prism film and the red photoluminescent layer, the curve L4 indicates intensities of lights of different wavelengths obtained by making the lights emitted by the blue backlight pass through the red photoluminescent layer and the color filter layer, and the curve L5 indicates intensities of lights of different wavelengths obtained by making the lights emitted by the blue backlight pass through the first prism film, the red photoluminescent layer and the color filter layer. Based on the curves L1, L2, and L3, the efficiency of the blue light can be effectively increased and the intensity of the blue light may be increased by providing the color filter substrate with the above-mentioned prism film. In addition, it should be known from the curves L2, L3, L4 and L5 that the intensities of the emitted lights can be effectively increased with the arrangement of the above-mentioned prism film.

Figure 5:
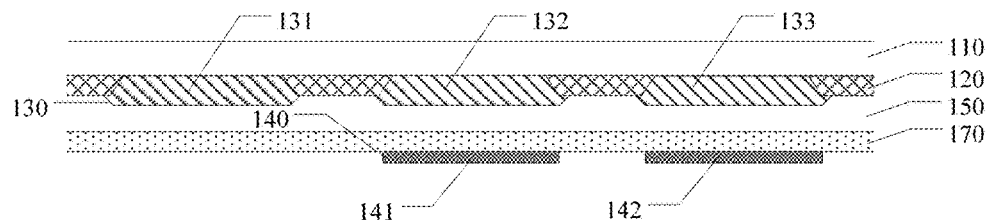
FIG. 5 is a schematic diagram of a color filter substrate provided by an embodiment of the present disclosure.

Referring to FIG. 5, a schematic diagram of a color filter substrate provided by an embodiment of the present disclosure is shown. The color filter substrate includes a base plate 110, a black matrix 120 and a color filter layer 130 formed on the base plate 110, a photoluminescent layer 140, a protective layer 150 and a brightness enhancement structure (i.e., a second prism film 170) arranged at a side of the color filter layer away from the base plate.

The color filter layer 130 includes a first color filter unit 131, a second color filter unit 132 and a third color filter unit 133. For example, the first color filter unit may be a blue (B) filter unit, the second color filter unit may be a green (G) filter unit, and the third color filter unit may be a red (R) filter unit.

The photoluminescent layer 140 includes multiple light-emitting units 141 and 142, and each light-emitting unit 141 or 142 corresponds to one filter unit 131, 132 or 133. Each light-emitting unit is used to emit light of the same color as the corresponding filter unit. For example, if a blue backlight is used, it is possible to provide light-emitting units of two colors for the above-mentioned color filter layer, i.e., a green light-emitting unit 141 corresponding to the green filter unit 132 and a red light-emitting unit 142 corresponding to the red filter unit 133, as shown in FIGS. 1, 2, 5, 6 and 7. The green light-emitting unit emits green light under the irradiation of blue light, and the red light-emitting unit emits red light under the irradiation of blue light.

As shown in FIG. 5, the brightness enhancement structure includes a second prism film 170 arranged at the side of the photoluminescent layer away from the color filter layer. The second prism film 170 is used to refract incident light from a side of the second prism film 170 away from the color filter layer 130 to the color filter layer 130.

In a possible embodiment, the above-mentioned second prism film 170 may be arranged between the color filter layer 130 and the photoluminescent layer 140. For example, the above-mentioned second prism film 170 may be disposed between the protective layer 150 and the photoluminescent layer 140.

Figure 6:
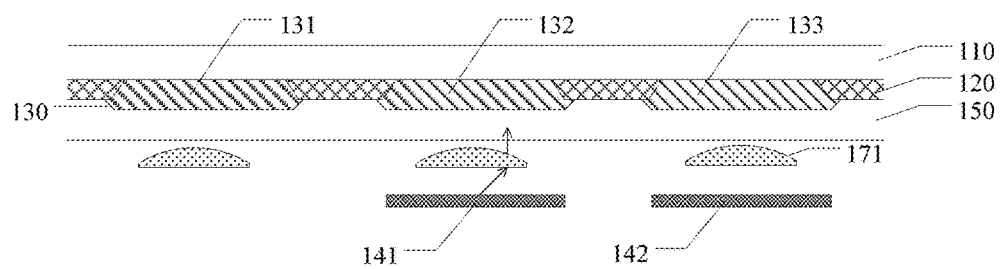
FIG. 6 is a schematic diagram of a color filter substrate provided by an embodiment of the present disclosure.

For example, as shown in FIG. 6, the second prism film 170 may include multiple second prisms 171 each of which corresponds to the position of the color filter layer 130. The light emitted by the photoluminescent layer is refracted by the second prism film to the color filter layer 130, thereby increasing the brightness at the light-outgoing side.

Figure 7:
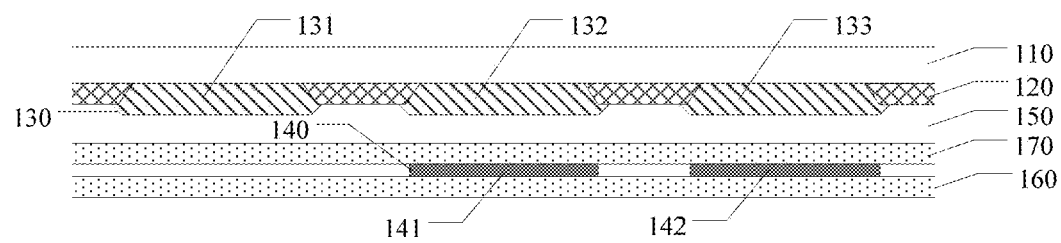
FIG. 7 is a schematic diagram of a color filter substrate provided by an embodiment of the present disclosure.

Referring to FIG. 7, a schematic diagram of a color filter substrate provided by an embodiment of the present disclosure is shown. The color filter substrate includes a base plate 110, a black matrix 120 and a color filter layer 130 formed on the base plate 110, a protective layer 150, a photoluminescent layer 140 and a brightness enhancement structure arranged at a side of the color filter layer 130 away from the base plate 110.

The color filter layer 130 includes a first color filter unit 131, a second color filter unit 132 and a third color filter unit 133. For example, the first color filter unit may be a blue (B) filter unit, the second color filter unit may be a green (G) filter unit, and the third color filter unit may be a red (R) filter unit.

The photoluminescent layer 140 includes multiple light-emitting units each of which corresponds to one filter unit and is used to emit light of the same color as the corresponding filter unit. For example, if a blue backlight is used, it is possible to provide light-emitting units of two colors for the above-mentioned color filter layer, i.e., a green light-emitting unit 141 corresponding to the green filter unit 132 and a red light-emitting unit 142 corresponding to the red filter unit 133. The green light-emitting unit emits green light under the irradiation of blue light, and the red light-emitting unit emits red light under the irradiation of blue light.

The brightness enhancement structure includes a first prism film 160 and a second prism film 170. The first prism film 160 is arranged at a side of the photoluminescent layer 140 away from the color filter layer 130 and is used to reflect incident light from the photoluminescent layer 140 back to the photoluminescent layer 140. The second prism film 170 is arranged between the protective layer 150 and the photoluminescent layer 140, and is used to refract incident light from a side of the second prism film 170 away from the color filter layer 130 to the color filter layer 130, thereby further increasing the brightness at the light-outgoing side of the color filter substrate.

In some embodiments, the first prism film 160 may adopt the structure of the first prism film as shown in FIG. 2, and the second prism film 170 may adopt the structure of the second prism film as shown in FIG. 6.

Figure 8:
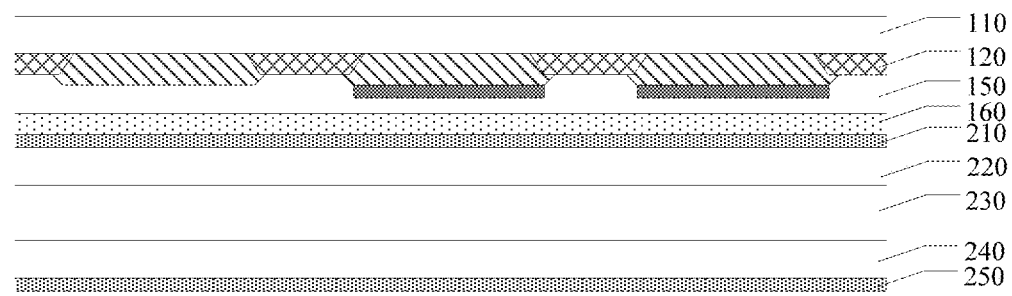
FIG. 8 is a schematic diagram of a display panel provided by an embodiment of the present disclosure.

Further, some embodiments of the present disclosure also provide a display panel including the above-mentioned color filter substrate. Referring to FIG. 8, a schematic diagram of a display panel provided by an embodiment of the present disclosure is shown. As shown in FIG. 8, the display panel includes, from bottom to top, a first polarizer 250, an array substrate 240, a liquid crystal layer 230, an intermediate substrate 220, a second polarizer 210, and the color filter substrate as shown in FIG. 1.

The first polarizer 250, the array substrate 240, the liquid crystal layer 230, the intermediate substrate 220, the second polarizer 210 and the color filter substrate are successively provided from bottom to top. Firstly, the light emitted by a backlight pass through the first polarizer to generate a linearly polarized light. Rotation states of the liquid crystal molecules in the liquid crystal layer 230 are controlled by the array substrate 240, thereby controlling a polarization state of the linearly polarized light passing through the liquid crystal layer. The second polarizer 210 can merely enable a polarized light in a predetermined direction to pass through, accordingly, different sub-pixels at a side of the second polarizer away from the liquid crystal layer may present different dark and bright states, and then the different dark and bright states are converted by the color filter substrate into colorful lights of corresponding colors, thereby presenting an required image.

Figure 9:
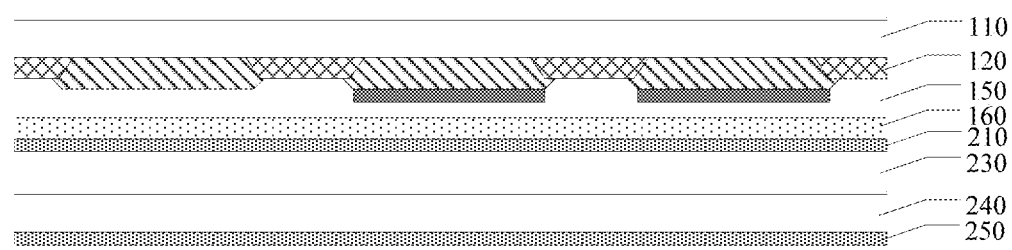
FIG. 9 is a schematic diagram of a display panel provided by an embodiment of the present disclosure.

The above-mentioned intermediate substrate 220 may be a glass substrate, or may be a flexible substrate. In a possible embodiment, in order to further reduce the thickness of the display panel, the intermediate substrate 220 may be omitted and the second polarizer 210 may be directly attached onto the color filter substrate. FIG. 9 is a schematic diagram of a display panel provided by an embodiment of the present disclosure. The display panel includes, from bottom to top, a first polarizer 250, an array substrate 240, a liquid crystal layer 230, a second polarizer 210 and a color filter substrate.

Further, some embodiments of the present disclosure provide a display device including a backlight and the above-mentioned display panel.

For example, the display device may adopt a blue backlight, and since the blue backlight emits blue light, corresponding to an RGB mode color filter substrate, the photoluminescent layer only needs to be provided with light-emitting units of two colors, i.e., a green light-emitting unit and a red light-emitting unit. Under the irradiation of the blue light emitted by the backlight, the green light-emitting unit may emit green light and the red light-emitting unit may emit red light, thereby effectively enlarging the color gamut of the display panel.

The display device provided by the embodiments of the present disclosure may be any product or component having a display function, such as a notebook computer display screen, a display, a television, a digital photo frame, a mobile phone, and a tablet computer.

The foregoing embodiments are merely illustrative for the present disclosure, but are not intended to limit the present disclosure. It will be apparent to those of ordinary skill in the art that various modifications and variations can be made without departing from the spirit and scope of the present disclosure, all equivalent solutions fall within the scope of this disclosure, and the scope of the present disclosure shall be defined by the claims.

What is claimed is:

1. A display panel, comprising a color filter substrate, an array substrate and a liquid layer arranged between the color filter substrate and the array substrate, wherein,
the color filter array comprises:
a base plate;
a color filter layer formed on the base plate;
a photoluminescent layer arranged at a side of the color filter layer away from the base plate; and
a brightness enhancement layer arranged at the side of the color filter layer away from the base plate and between the color filter layer and the liquid crystal layer.

2. The display panel according to claim 1, wherein the brightness enhancement structure comprises a first prism film arranged at a side of the photoluminescent layer away from the color filter layer, and the first prism film is configured to reflect an incident light from the photoluminescent layer back to the photoluminescent layer.

3. The display panel according to claim 2, further comprising a black matrix formed on the base plate, wherein the first prism film comprises a plurality of first prisms, and each of the plurality of first prisms corresponds to a position of the black matrix.

4. The display panel according to claim 3, wherein a light reflecting layer is provided on a surface of the black matrix facing the first prism film.

5. The display panel according to claim 1, wherein the brightness enhancement structure comprises a second prism film, the second prism film is configured to refract an incident light from a side of the second prism film away from the color filter layer to the color filter layer.

6. The display panel according to claim 5, wherein the second prism film is arranged between the color filter layer and the photoluminescent layer.

7. The display panel according to claim 5, wherein the second prism film comprises a plurality of second prisms each of which corresponds to a position of the color filter layer.

8. The display panel according to claim 1, wherein the photoluminescent layer comprises a photoluminescent material and a photoresist.

9. The display panel according to claim 8, wherein the photoluminescent material comprises at least one of: a quantum dot and a quantum rod.

10. The display panel according to claim 8, wherein a mass fraction of the photoluminescent material in the photoluminescent layer ranges from 1% to 50%.

11. The display panel according to claim 1, wherein the color filter layer comprises a plurality of filter units of different colors, the photoluminescent layer comprises a plurality of light-emitting units, and each of the plurality of light-emitting units corresponds to one filter unit and is configured to emit light of an identical color to the corresponding filter unit.

12. The display panel according to claim 1, further comprising a first polarizer and a second polarizer.

13. A display device, comprising a backlight and a display panel, wherein the display panel comprises a color filter substrate comprising a base plate, a color filter layer formed on the base plate, a photoluminescent layer arranged at a side of the color filter layer away from the base plate, and a brightness enhancement layer arranged at the side of the color filter layer away from the base plate and between the color filter layer and the liquid crystal layer.

14. The display device according to claim 13, wherein
the backlight emits blue light,
the photoluminescent layer comprises a green light-emitting unit and a red light-emitting unit, and
the green light-emitting unit emits green light under irradiation of the blue light and the red light-emitting unit emits red light under irradiation of the blue light.

15. The display panel according to claim 6, wherein the second prism film comprises a plurality of second prisms each of which corresponds to a position of the color filter layer.

16. The display panel according to claim 9, wherein a mass fraction of the photoluminescent material in the photoluminescent layer ranges from 1% to 50%.

* * * * *